(12) United States Patent
Beadle

(10) Patent No.: US 7,993,040 B2
(45) Date of Patent: Aug. 9, 2011

(54) SPIKE FOR OUTDOOR LIGHTING FIXTURE

(75) Inventor: Joshua Z. Beadle, San Diego, CA (US)

(73) Assignee: Hunter Industries Incorporated, San Marcos, CA (US)

( * ) Notice: Subject to any disclaimer, the term of this patent is extended or adjusted under 35 U.S.C. 154(b) by 378 days.

(21) Appl. No.: 12/266,518

(22) Filed: Nov. 6, 2008

(65) Prior Publication Data

US 2009/0122564 A1 May 14, 2009

Related U.S. Application Data

(60) Provisional application No. 60/988,065, filed on Nov. 14, 2007.

(51) Int. Cl.
*F21S 8/00* (2006.01)

(52) U.S. Cl. ............... 362/431; 362/153; 362/153.1

(58) Field of Classification Search ............ 362/418, 362/460, 431, 153, 153.1, 362, 364, 365; 248/156, 530, 545
See application file for complete search history.

(56) References Cited

U.S. PATENT DOCUMENTS

| | | | |
|---|---|---|---|
| 3,104,064 A * | 9/1963 | Bellek | 362/267 |
| 3,519,726 A | 11/1968 | Ewing | |
| 4,290,094 A | 9/1981 | Jensen | |
| 4,974,134 A | 11/1990 | Bourne | |
| 5,337,993 A | 8/1994 | Hersman | |
| 5,649,760 A * | 7/1997 | Beadle | 362/270 |
| 5,655,829 A * | 8/1997 | Lin et al. | 362/145 |
| 6,575,591 B1 * | 6/2003 | De Lany | 362/153 |
| 6,583,700 B1 | 6/2003 | Beadle | |
| 6,612,720 B1 * | 9/2003 | Beadle | 362/287 |
| 7,470,895 B1 | 12/2008 | Cramer et al. | |

* cited by examiner

*Primary Examiner* — John A Ward
(74) *Attorney, Agent, or Firm* — Eleanor M. Musick; Procopio, Cory, Hargreaves & Savitch, LLP

(57) ABSTRACT

A spike for outdoor lighting fixture includes a receptacle portion integrated into the body of the spike with an open section and a removable transparent window that is configured to enclose the receptacle portion. The transparent window is attached to the receptacle portion using one or more screws or other fasteners. The spike can include an internally threaded upper portion for receiving a post upon which a lighting fixture is mounted and/or a lamp socket can be attached to the top of the spike and a protective housing fitted around the outer edges of the top of the spike. In a preferred embodiment, the receptacle portion is divided into multiple compartments, e.g., for storing excess cable or spare parts, or for securing connection points of a wiring installation. The transparent window permits visual examination of the connection within the receptacle without removing the transparent window.

30 Claims, 5 Drawing Sheets

SPIKE FOR OUTDOOR LIGHTING FIXTURE

RELATED APPLICATIONS

This application claims the priority of U.S. Provisional Application No. 60/988,065, filed Nov. 14, 2007, which is incorporated herein by reference in its entirety.

FIELD OF THE INVENTION

The present invention relates to lighting fixtures for landscape and environmental lighting applications and, more particularly, to devices for securing lighting fixtures at or near the ground

BACKGROUND

Outdoor lighting fixtures have been widely adopted for illuminating buildings, gardens, pathways, and entrance ways as the nighttime play of light on the landscape and vegetation can aesthetically pleasing as well as providing sufficient light for safely navigating an otherwise dark walkway. Additionally, such lighting provides enhanced security by eliminating hiding places and unobserved entry points for intruders. The most widely used outdoor lighting systems include one or more low voltage lighting fixtures that are connected to a 12 V transformer that is, in turn, connected to a standard 120 VAC line. Other types of lighting that are gaining popularity are solar powered, where the fixtures are connected by a cable to a solar collector panel that is located at a sunny location during daylight hours. Each lighting fixture generally includes housing, a lamp assembly having a halogen or conventional incandescent bulb and a reflector, and a lens or window. Many configurations are known for providing a variety of different lighting effects.

Many outdoor lighting fixtures that are intended to be located at or slightly above ground level are provided with spikes that can be driven into the ground to provide an inexpensive and stable base for supporting the light. Electrical cables, typically containing copper wire, are employed to supply current to the fixtures. Cables that are placed away from a structure or pavement are preferably buried at a shallow depth, or they may lie directly on the ground. Connection of the fixture to the cable typically involves cutting the cable, stripping the cable insulation a short distance from the cut ends, and twisting together the ends of one wire from the fixture and one conductor from the cable within a twist-on wire connector for both sets of wires. Because this connection is vulnerable to moisture, dirt and/or corrosion that can cause the connection to fail, a recommended practice is to enclose the wire ends and wire connectors in a small plastic bag which can be sealed with a potting material (splice gel) to create a permanent watertight seal. The upper edges of the plastic bag can optionally be sealed around the wires above the junction with electrical tape, a rubber band or a cable tie. Because this seal is permanent, replacement of the fixture, or splicing of additional cables, requires that the existing wires be cut and new connections created. Therefore, it is important to make sure there are excess lengths of conductors to allow the new connections to be made. The extra cable length can lead to an additional point of vulnerability because it might extend away from the spike, making it vulnerable to damage by someone digging near the spike, for example, replacing plants, where the extended sections of wire would be.

Another problem encountered by currently existing methods is that a failure in the outdoor lighting fixture can be difficult to diagnose. In most cases where the failure is an incomplete connection, it can be difficult to pinpoint where the wires are actually connected to identify a potentially defective junction. If the connection at a particular fixture is suspected, it may be necessary to remove the spike from the ground and dig a radius around the spike's location because the excess cable may have caused the junction to be offset several inches from the spike.

Accordingly, there is a need for a device and method to facilitate creation of the connection and for providing protection of the junction to ensure the integrity of the connection. The present invention is directed to such an invention.

SUMMARY OF THE INVENTION

It is an advantage of the present invention to provide a ground spike for supporting a light fixture that has a built-in junction box for protecting the connection and excess cable and keeping them clean.

It is another advantage of the invention to provide a ground spike that allows the connection to be easily viewed to visually check the integrity of the connection.

Still another advantage of the invention is provide ready access to the connection for testing and replacement of fixtures or cables.

In an exemplary embodiment, the present invention comprises a spike for outdoor lighting fixture that includes a receptacle portion integrated into the body of the spike with an open section and a removable transparent window that is configured to enclose the receptacle portion. The transparent window is attached to the receptacle portion using one or more screws or other fasteners. An O-ring seat may be formed along either the edges of the receptacle or the perimeter of the window to retain an O-ring or resilient seal that produces a substantially watertight seal when the window is fastened to the receptacle portion. The spike can include an internally threaded upper portion for receiving a post upon which a lighting fixture is mounted and/or a lamp socket can be attached to the top of the spike and a protective housing fitted around the outer edges of the top of the spike. In a preferred embodiment, the receptacle portion is divided into multiple compartments, e.g., for storing excess cable or spare parts for the fixture, such as extra twist-on wire connectors or lamps, or for securing connection points of a wiring installation. The transparent window that seals the receptacle portion permits visual examination of the connection within the receptacle without removing the transparent window. The receptacle portion includes at least one slot through which the cable connected to a power supply is fed into the spike. If the lighting fixture is powered by batteries, for example, batteries recharged by a solar panel, the batteries and battery connections may be retained within the receptacle portion.

The spike is typically installed in an outdoor location by forcing it into the ground if the ground is sufficiently soft to do so without damaging the spike. In harder ground, a pilot hole can be dug with an auger or pick. Penetration of the ground is facilitated by the pointed end of the spike. Stability of the spike is enhanced by a barb at the bottom portion of the spike. In the preferred embodiment, for further stability the barb is formed from three parallel triangles which form a main central barb with two smaller triangles on either side of the center to form additional barbs.

BRIEF DESCRIPTION OF THE DRAWINGS

The present invention will be more clearly understood from the following detailed description of the preferred embodiments of the invention and from the attached drawings, in which.

DETAILED DESCRIPTION

The following description sets forth numerous specific details such as examples of specific systems and components, and so forth, in order to provide a good understanding of several embodiments of the present invention. It will be apparent to one skilled in the art, however, that at least some embodiments of the present invention may be practiced without these specific details. In other instances, well-known components or methods are not described in detail in order to avoid unnecessarily obscuring the present invention. Thus, the specific details set forth are merely exemplary. Particular implementations may vary from these exemplary details and still be contemplated to be within the spirit and scope of the present invention.

Figure 1:
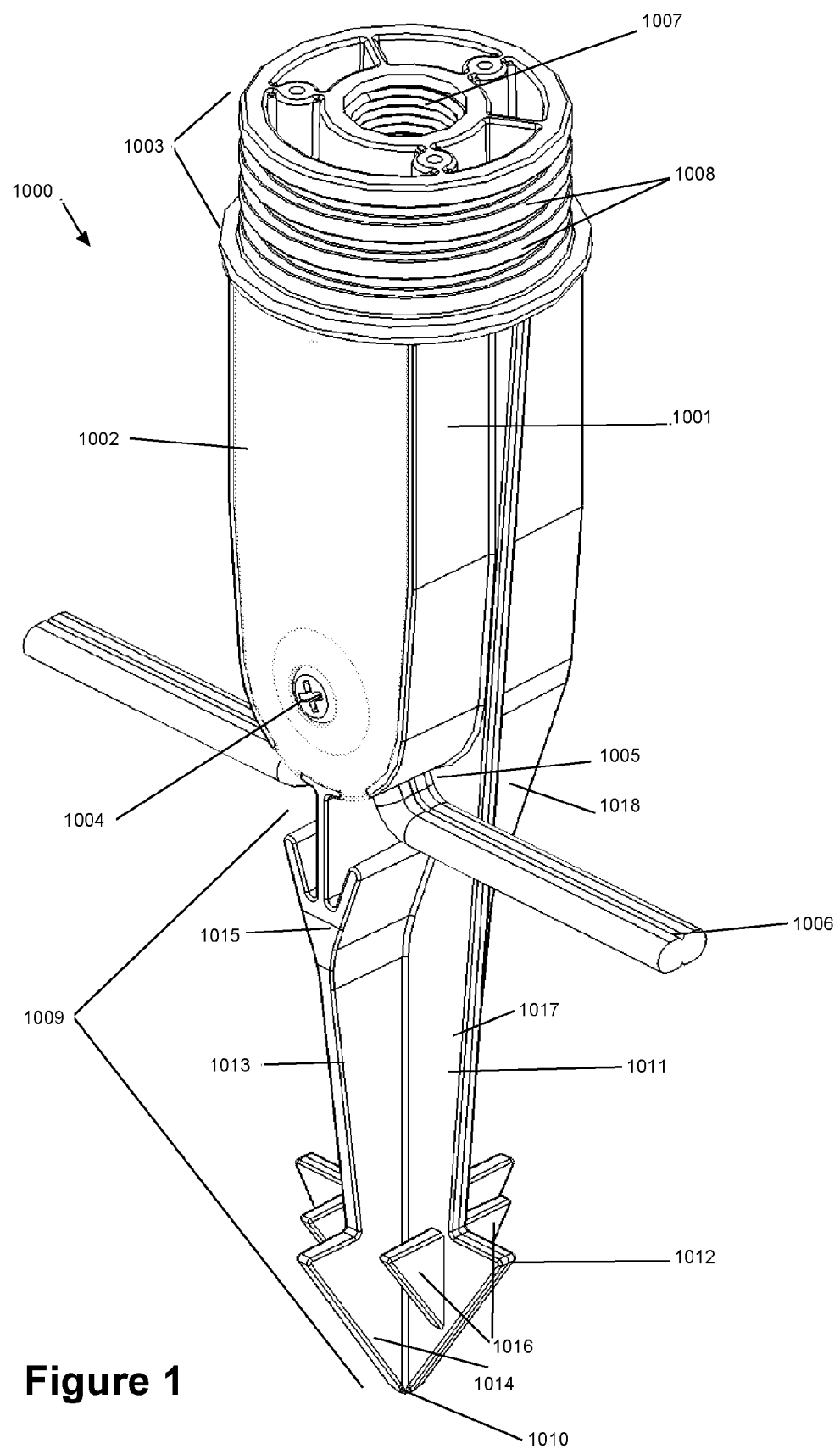
FIG. 1 is a perspective view of an embodiment of the spike according to the present invention.

FIG. 1 is a perspective view of an embodiment of the spike 1000 for outdoor lighting fixtures, which includes a receptacle portion 1001 with a transparent window 1002, an upper portion 1003 for supporting the fixture, and a lower portion 1009 which facilitates placement and enhances stability when installed. The spike 1000 provides a base for secure anchorage of a lighting fixture, examples of which are shown as 2001 and 3001 in FIG. 2 and FIG. 3, respectively, and described more fully below.

The opening of the receptacle portion 1001 is enclosed by a transparent window 1002 forming at least one compartment in the body of the spike 1000. The transparent window 1002 is removably attached to the receptacle portion 1001 by a screw 1004 to provide a seal resulting in a compartment in the receptacle portion 1001 that is well protected against mechanical damage and largely resistant to contaminant intrusion. An optional O-ring seat may be formed along either the edges of the receptacle opening or the perimeter of the window 1002 to retain an O-ring or resilient seal that produces a substantially watertight seal when the window is fastened to the receptacle portion. More than one screw, or alternative types of fasteners may also be used. The receptacle portion 1001 can be divided into multiple compartments for storing different materials.

Figure 4:
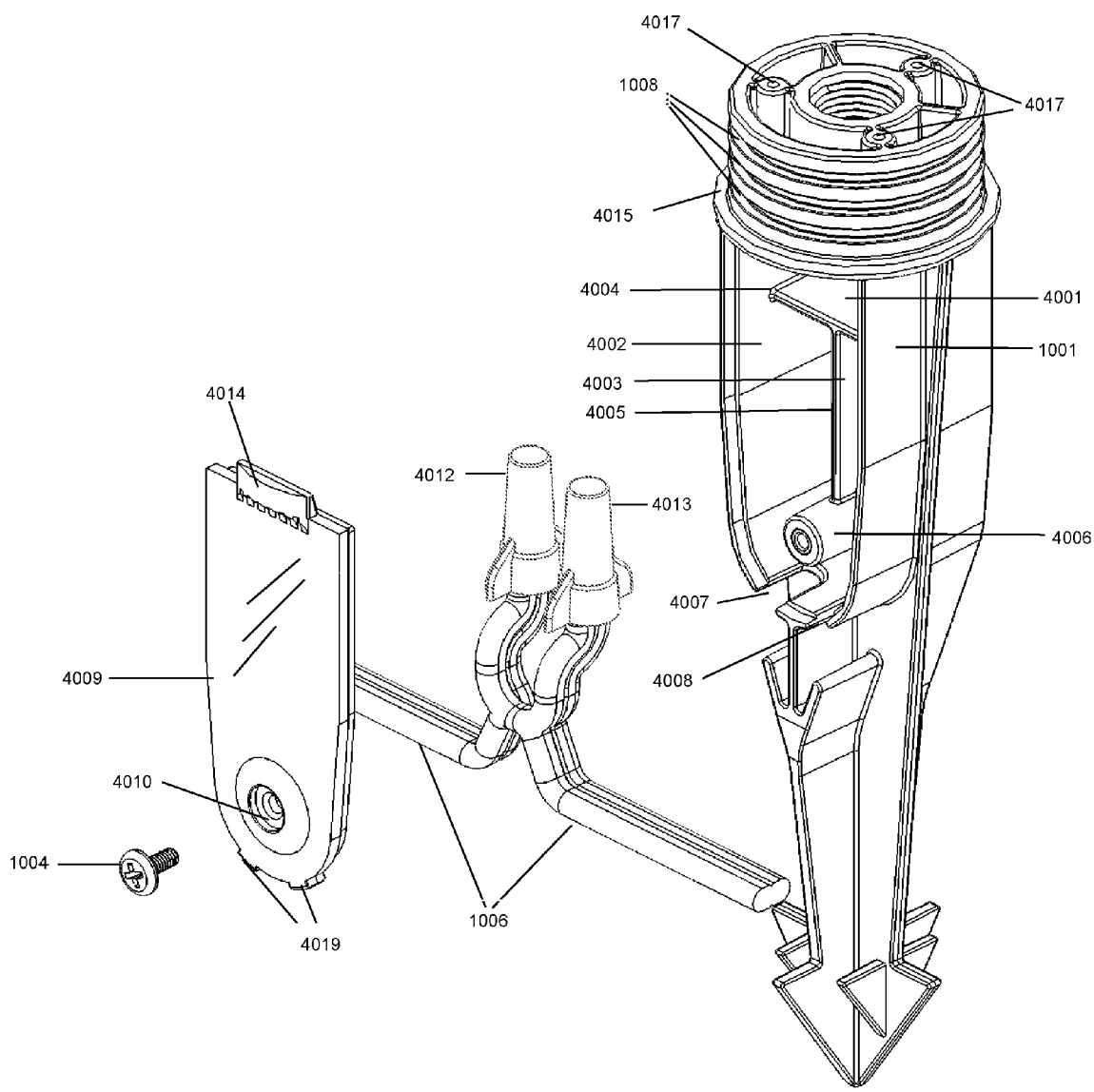
FIG. 4 is an exploded perspective view of the spike according to the present invention.

FIG. 4 provides a more detailed view of the receptacle portion 1001 of an exemplary embodiment of the inventive spike. In the exemplary embodiment, the interior cavity of receptacle portion 1001 is partitioned into multiple compartments to enhance storage capability. As illustrated, compartments 4001, 4002 and 4003 are defined by dividers 4004 and 4005. In this configuration, compartment 4001 can be used to hold coiled excess wire (sometimes referred to as the "service coil") and to provide a feed-through opening 4020 (seen in FIG. 5) at its top for connection to the fixture, while the wire connectors 4012 and 4013 and their corresponding conductors are retained within compartments 4002 and 4003, respectively. The three compartments are exemplary only, and other configurations may be used. For example, for a solar fixture, the rechargeable batteries that store the voltage produced by the solar collector can be stored in a single compartment or one of multiple compartments.

Boss 4006 located at the lower end of divider 4005 has an internally threaded bore for receiving screw 1004 for firm attachment of transparent window 1002. While only one attachment point is shown, it will be recognized that two or more threaded bores may be provided, each for receiving a screw or other fastener for secure attachment of the window 1002. Located at the lower portion of the interior cavity is a pair of slots 4007 and 4008 through which conductors 1006 are fed into the interior. Generally, multiple slots positioned on opposite sides of the cavity are preferred since the conductors often enter from opposite directions, however, a single, larger slot can be used to insert both wires. The positioning of the slots 4007, 4008 may also be moved to a position higher on the sides of the receptacle portion, or multiple pairs of punch outs may be provided through the sidewall of the cavity to allow the installer to choose the most appropriate entry points for the particular installation.

Figure 5:
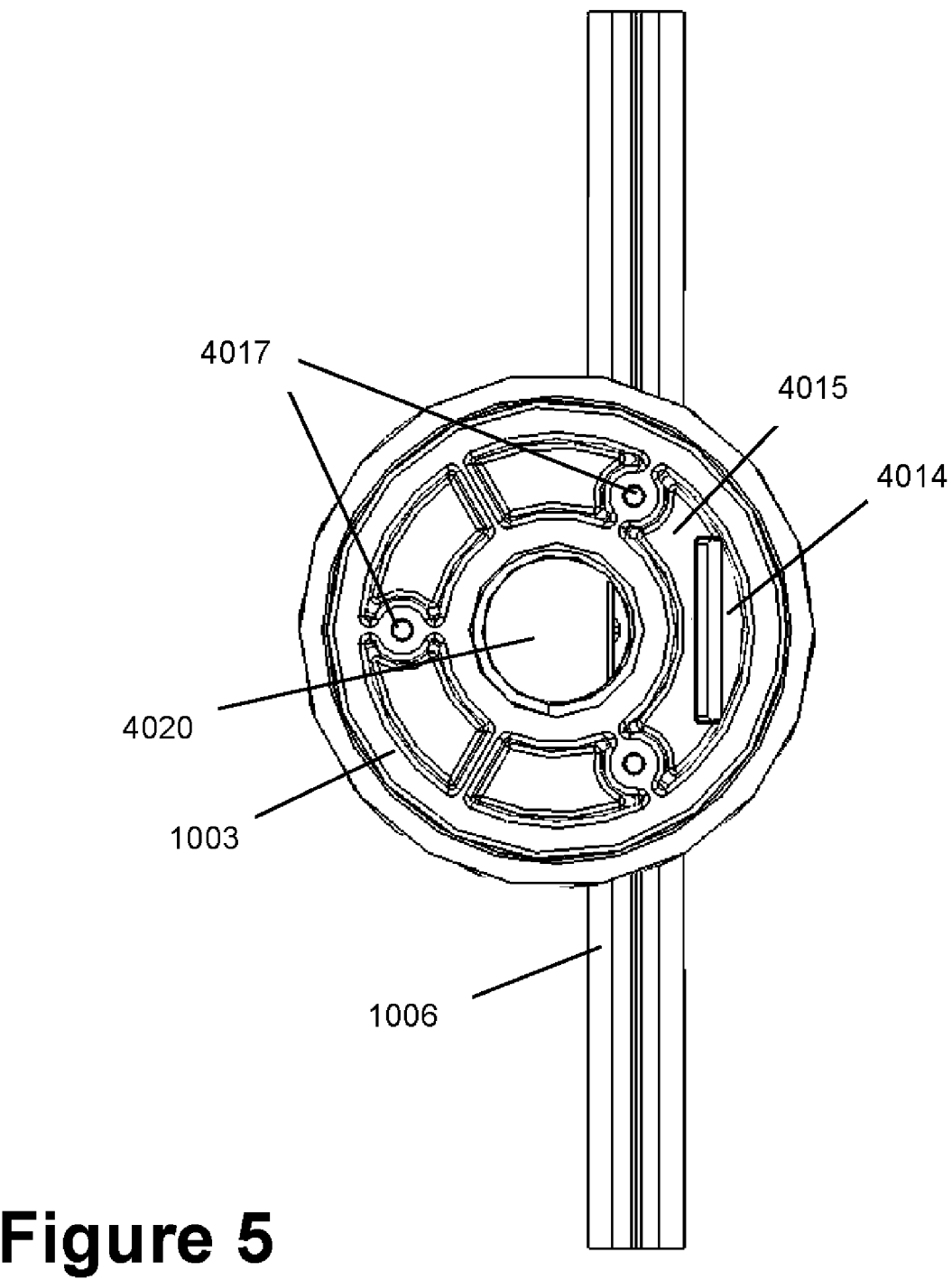
FIG. 5 is a top view of the spike according to the present invention.

As shown in FIG. 4, the transparent window 1002 has a tab 4014 extending from its upper edge which is inserted into a corresponding slot (not shown) in the plate 4015 that defines the top of receptacle portion 1001 and bottom of top portion 1003. (Feed-through opening 4020 is located at the center of plate 4015.) Referring to FIG. 5, the profile of tab 4014 can be seen as having a curved face that corresponds to the inner curvature of top portion 1003. Tab 4014 extends though plate 4015 to firmly seat the upper part of window 1002 against receptacle portion 1001. Screw 1004 is then inserted through reinforced bore 4010 through the window 1002 and screwed into the threaded bore in boss 4006. Tabs 4019 project from the bottom of window 1002 at positions corresponding to slots 4007 and 4008 to further secure conductors 1006 as they exit from the interior cavity. While the slots 4007 and 4008 are not fully sealed, attachment of the window 1002 to receptacle portion 1001 produces a seal that will exclude most contaminants. To produce a substantially water resistant seal, O-rings or other washers may be fitted over the conductors 1006 at the entry point so that they are compressed against the edges of the slots 4007, 4008.

The transparent window 1002, formed from a hard, impact resistant plastic or polymer, such as clear polycarbonate, permits visual inspection allowing the installer to determine if a faulty connection point exists within the receptacle portion 1001 of the spike 1000 without removing the transparent window.

Figures 2, 3:
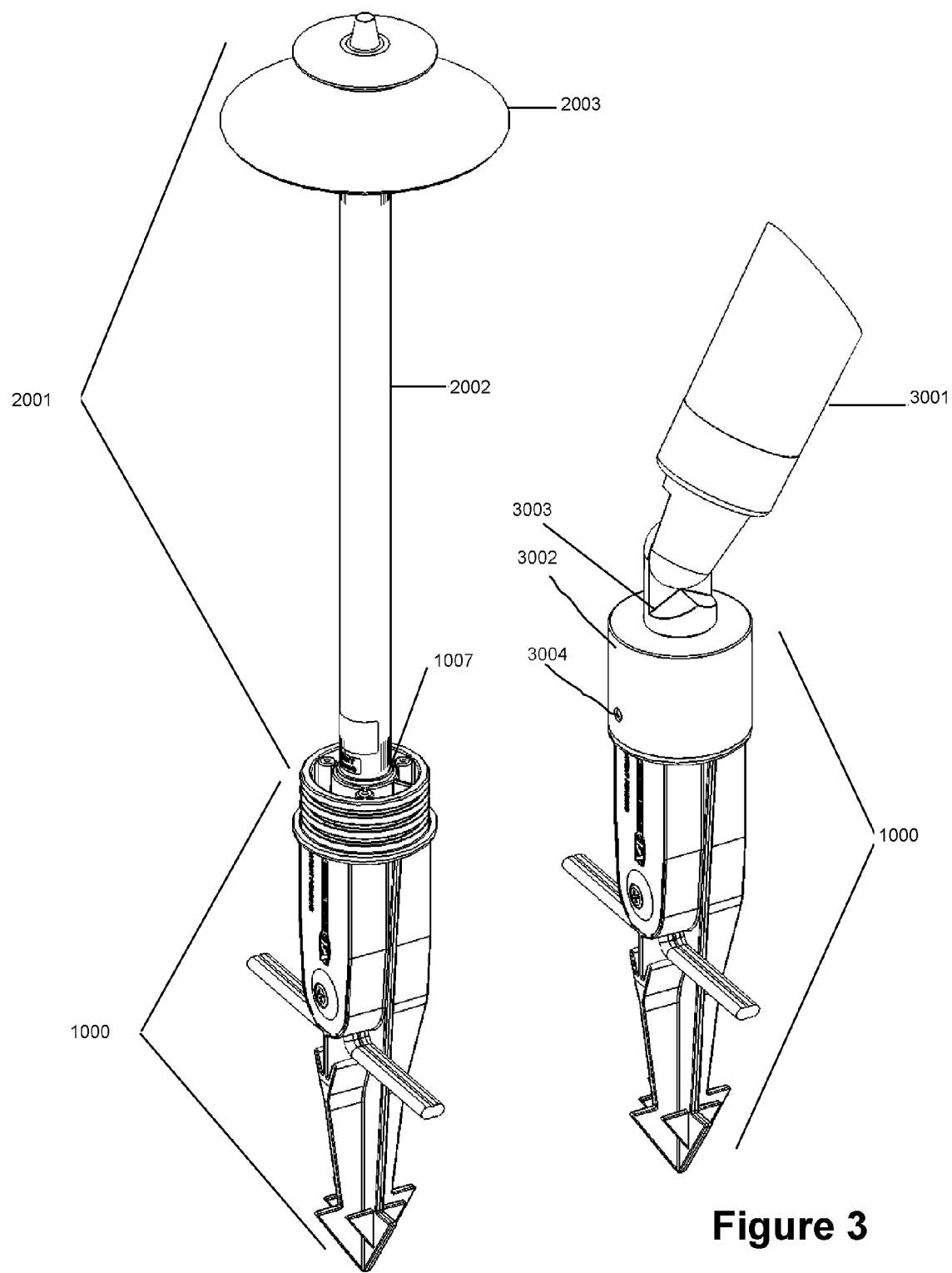
FIG. 2 is a perspective view of a first exemplary lighting fixture mounted on the spike.
FIG. 3 is a perspective view of a second exemplary lighting fixture mounted on the spike.

The upper portion 1003 of the spike can include a concentric threaded bore 1007, which corresponds to feed-through opening 4020, configured to receive a threaded post 2002 for supporting a lighting fixture, such as the path light 2003 illustrated in FIG. 2. Typically, the threads in bore 1007 will be ½ NPS threads. Conductors for providing voltage to a lamp socket mounted at the top of the post 2002 are fed through feed-through opening 4020 and up through the post. Thus, all connections for the fixture other than the connection to the socket itself are securely contained within the receptacle portion 1001. In this application, the spike 1000 will generally be inserted into the ground so that its top edge is approximately flush with the ground level.

In another application, the spike 1000 can be used in conjunction with a spot light fixture such as fixture 3001 illustrated in FIG. 3. For this usage, the exterior surface of upper portion 1003 has one or more annular O-ring seats 1008 for retaining an O-ring (shown in FIG. 6 as 6005). In the preferred embodiment, at least two O-rings 6005 are used to produce a watertight seal between the spike and the fixture in a manner similar to that described in U.S. Pat. No. 6,874,905, which is incorporated herein by reference. Fixture 3001 is mounted on a knuckle joint 3003 which has a base portion 3002 that is a hollow cap having an interior dimension that closely fits over upper portion 1003 so that the inner surface of the base 3002, slightly compresses the O-ring(s) that are retained within O-ring seat(s) 1008. The interference fit created by this compression of the O-ring holds the base 3002 over the top of the spike, but for additional security, a locking screw 3004 may be provided which, when engaged, presses against the outer surface of the top portion 1003. In this configuration, it may be desirable to install the spike so that it protrudes above the ground level, so that the base 3002 is above ground level.

Figure 6:
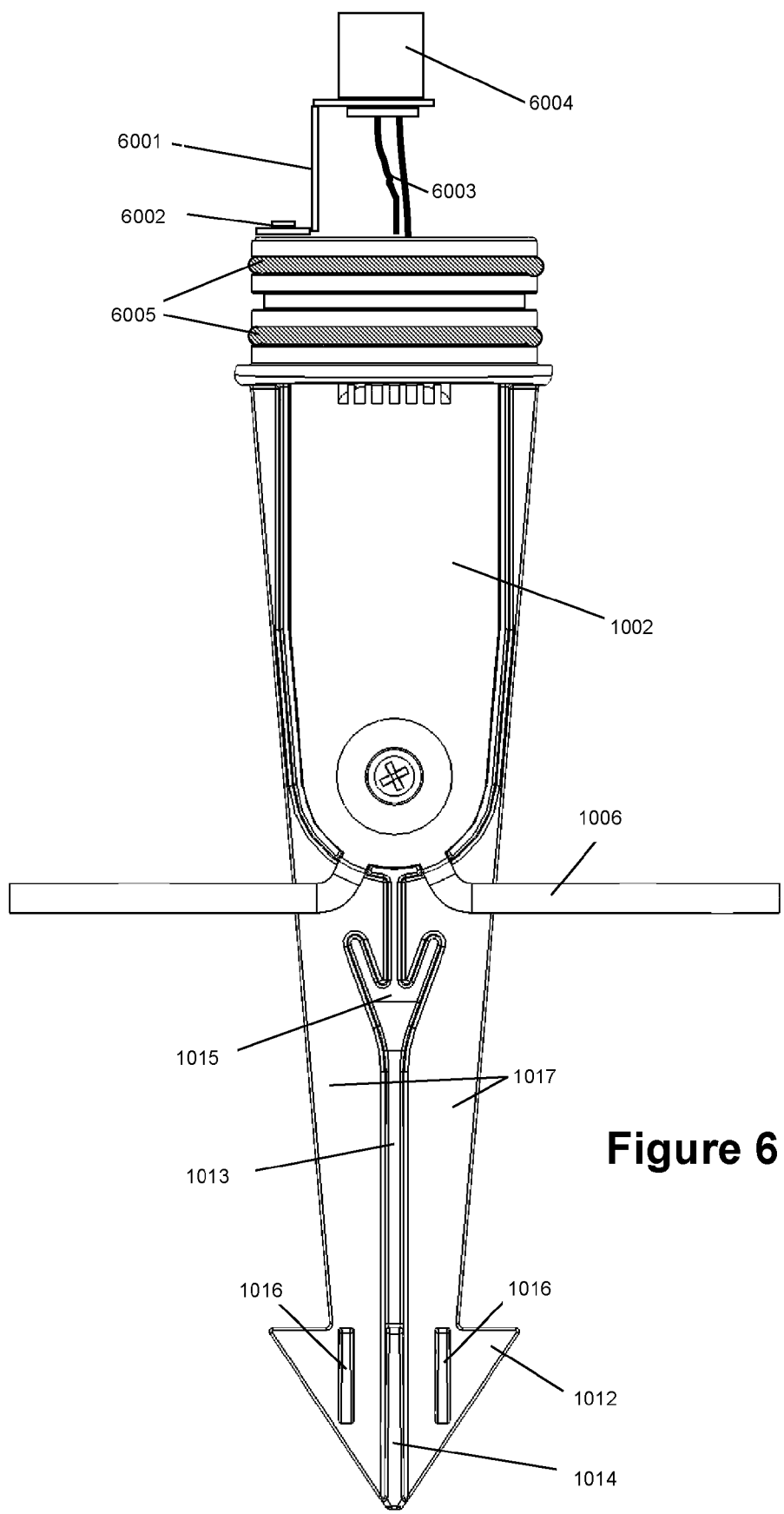
FIG. 6 is a front elevation of a third exemplary lighting fixture incorporating the spike.

In the embodiment illustrated in FIG. 6, the spike itself can be the lighting fixture by attaching a socket mounting bracket 6001 directly to the top portion 1003. The bracket can be a simple Z-shaped aluminum bracket that is attached via a screw 6002 inserted into one of threaded bores 4017 shown in FIGS. 4 and 5. Socket 6004 is affixed atop bracket 6001 with conductors 6003 extending down through the feed-through into the interior cavity of receptacle portion 1003. A closed-top cylindrical diffuser (not shown) or other protective cover has interior dimensions to fit closely over the outer diameter of top portion 1003 in a similar manner to base 3002 in the embodiment of FIG. 3. The O-ring(s) 6005 provide a watertight seal to enclose the socket and lamp (not shown) when the cover is put in place. This type of application can be used for lighting very close to the ground. It may even be desirable to plunge the spike to a depth greater than its length, so that a portion of the cover is also below ground level to provide small "dots" of light within landscaping, for example, for subtle marking of a path across a lawn.

The body of the spike consisting of receptacle portion 1001, the top portion 1003 and the bottom portion 1009 of the spike 1000 are typically injection molded. In particular the receptacle, upper and bottom portions can be formed of high density, high impact plastic or similar material. In the preferred embodiment, Acrylonitrile Butadiene Styrene (ABS), a heat resistant, high impact resistant plastic resin is used.

The spike 1000 is installed in an outdoor location by forcing the spike 1000 into the ground. This process is enhanced by a bottom portion 1009 of the spike 1000 that is configured for initial ground penetration using pointed tip 1010. The shaft 1011 has a ribbed construction with longitudinal ribs 1013 and 1017 extending radially from the primary axis of the shaft. The ribs add strength to the spike as well as assisting in penetration into the ground. Ribs 1017, extending to the sides (as viewed from the front), terminate in a barb 1012. Rib 1013 on the front of the spike and its counterpart on the back terminate in barb 1014, which is perpendicular to and bisects barb 1012. Additional strength and stability are provided by two smaller barbs 1016 positioned on opposite sides of barb 1014. It will be readily apparent that different numbers of ribs may be used, with the ribs preferably being in pairs so that each opposing pair with terminate in a barb.

Near the upper portion of front rib 1013, an additional barb 1015 serves to reduce any resistance that might be encountered during installation by effectively adding a taper to the lower front of the receptacle portion. Barb 1015 also acts to protect the conductors 1006 at the point that they enter the receptacle portion 1001 to reduce pressure on a potentially vulnerable portion of the conductors as the spike is inserted into the ground. The lower back side of the receptacle portion 1001 has a taper 1018 to further facilitate insertion into the ground.

The foregoing description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A spike for an outdoor lighting fixture comprising:
    an upper portion having a fastening means for supporting a lamp assembly;
    a receptacle portion having a interior cavity having an enclosed top, back and two sidewalls, the top having an opening therethrough adapted for receiving a set of lamp conductors from the lamp assembly;
    a window releasably attached to the receptacle portion for enclosing the interior cavity, wherein the interior cavity is visible through the window; and
    a bottom portion having a point at a lower end for ground penetration;
    wherein the receptacle portion and the bottom portion together define a substantially continuous tapered profile from the top of the receptacle portion to the point at the lower end of the bottom portion, and wherein the receptacle portion and the bottom portion are adapted for insertion substantially below ground level.

2. The spike of claim 1, wherein the receptacle portion has at least one partition dividing the interior cavity into distinct compartments.

3. The spike of claim 1, wherein the receptacle portion has two partitions for dividing the interior cavity into three distinct compartments, wherein each of two of the compartments is dimensioned to receive a power conductor and a wire connector.

4. The spike of claim 1, wherein the sidewalls have at least one opening adapted to pass power conductors from outside of the receptacle portion to the interior cavity.

5. The spike of claim 4, wherein an opening is formed through each sidewall.

6. The spike of claim 1, wherein the bottom portion has a plurality of longitudinal ribs formed therein terminating in at least one barb.

7. The spike of claim 1, wherein the upper portion comprises an internally threaded bore dimensioned for receiving a lower end of an externally threaded post.

8. The spike of claim 1, wherein the upper portion has an outer dimension adapted to fit within a cylindrical base of a lighting fixture so that the upper portion is substantially enclosed within the cylindrical base.

9. The spike of claim 8, wherein the upper portion has an outer surface with at least one O-ring seat formed therein, and further comprising an O-ring disposed within the at least one O-ring seat, the O-ring adapted to create an interference fit between the outer surface of the upper portion and an interior surface of the cylindrical base.

10. The spike of claim 1, wherein the upper portion has an outer dimension adapted to fit within a cylindrical cover of a lighting fixture, and further comprising a bracket adapted for supporting a lamp socket.

11. A spike for an outdoor lighting fixture comprising:
a tapered base member having a pointed lower end and an upper portion comprising a fastening means for mounting a lamp assembly;
a receptacle portion integrally formed with the base member near the upper portion, the receptacle portion having an interior cavity with an open front and at least one opening adapted to pass a connection means into the cavity for supplying energy from a source to the lamp assembly; and
a transparent window removably attached to the receptacle portion for closing the open front, wherein the cavity is viewable through the transparent window
wherein the receptacle portion and the base member together define a substantially continuous tapered profile from the upper portion to the pointed lower end and the base member and receptacle portion are adapted for insertion substantially below ground level.

12. The spike of claim 11, wherein the receptacle portion has at least one partition dividing the interior cavity into distinct compartments.

13. The spike of claim 12, wherein the receptacle portion has two partitions dividing the interior cavity into three distinct compartments, wherein each of two of the compartments is dimensioned to receive a power conductor and a wire connector.

14. The spike of claim 11, wherein the sidewalls have at least one opening for feeding power conductors from outside of the receptacle portion to the interior cavity.

15. The spike of claim 14, wherein an opening is formed in each sidewall.

16. The spike of claim 11, wherein the bottom portion has a plurality of longitudinal ribs formed therein terminating in at least one barb.

17. The spike of claim 11, wherein the upper portion comprises an internally threaded bore dimensioned for receiving a lower end of an externally threaded post.

18. The spike of claim 11, wherein the upper portion has an outer dimension adapted to fit within a cylindrical base of a lighting fixture so that the upper portion is substantially enclosed within the cylindrical base.

19. The spike of claim 18, wherein the upper portion has an outer surface with at least one O-ring seat formed therein, and further comprising an O-ring disposed within the at least one O-ring seat, the O-ring adapted to create an interference fit between the outer surface of the upper portion and an interior surface of the cylindrical base.

20. The spike of claim 11, wherein the upper portion has an outer dimension adapted to fit within a cylindrical cover of a lighting fixture, and further comprising a bracket extending upward from the upper portion, and a lamp socket disposed on the bracket.

21. A combination ground spike and junction box, comprising:
an upper portion adapted to support a light fixture;
a tapered body extending downward from the upper portion, the tapered body having a pointed end and a profile comprising a substantially continuous taper from the upper portion to the pointed end;
a receptacle integrally formed with the tapered body, the receptacle comprising walls and an openable panel to define a cavity dimensioned to receive electrical conductors from the light fixture, electrical conductors from a power source, and wire connectors; and
at least one opening in the receptacle adapted to pass the electrical conductors into and out of the cavity;
wherein the tapered body and receptacle adapted for insertion substantially below ground level.

22. The combination of claim 21, wherein the openable panel is formed from a transparent material.

23. The combination of claim 21, wherein the at least one opening comprises an upper opening for passing electrical conductors between the light fixture and the cavity.

24. The combination of claim 21, wherein the power source is external to the receptacle and the at least one opening comprises one or more side openings for passing electrical conductors between the cavity and the power source.

25. The combination of claim 21, wherein the power source comprises one or more batteries and the cavity is further dimensioned to retain the batteries therein.

26. The combination of claim 21, wherein the at least one opening comprises one or more side openings for passing electrical conductors between the batteries and a solar panel.

27. The combination of claim 21, wherein the upper portion comprises an internally threaded bore dimensioned for receiving a lower end of an externally threaded post.

28. The combination of claim 21, wherein the upper portion has an outer dimension that fits within a cylindrical base of a lighting fixture so that the upper portion is substantially enclosed within the cylindrical base.

29. The combination of claim 21, wherein the upper portion has an outer dimension that fits within a cylindrical cover of a lighting fixture, and further comprising a bracket extending upward from the upper portion, and a lamp socket disposed on the bracket.

30. The combination of claim 21, wherein the receptacle has at least one partition dividing the cavity into multiple compartments.

* * * * *